(12) United States Patent
Foege

(10) Patent No.: US 9,097,208 B2
(45) Date of Patent: Aug. 4, 2015

(54) CRYOGENIC PUMP SYSTEM FOR CONVERTING FUEL

(71) Applicant: Electro-Motive Diesel, Inc., LaGrange, IL (US)

(72) Inventor: Aaron Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 81 days.

(21) Appl. No.: 13/715,456

(22) Filed: Dec. 14, 2012

(65) Prior Publication Data
US 2014/0165584 A1    Jun. 19, 2014

(51) Int. Cl.
| | |
|---|---|
| F02C 3/20 | (2006.01) |
| F02C 3/34 | (2006.01) |
| F02C 6/20 | (2006.01) |
| F02K 3/00 | (2006.01) |
| F02C 7/224 | (2006.01) |
| F02C 3/22 | (2006.01) |

(52) U.S. Cl.
CPC ... *F02K 3/00* (2013.01); *F02C 3/20* (2013.01); *F02C 3/22* (2013.01); *F02C 6/20* (2013.01); *F02C 7/224* (2013.01); *F02C 3/34* (2013.01); *Y02E 20/16* (2013.01)

(58) Field of Classification Search
CPC ............... F02C 3/20; F02C 6/16; F02C 6/20; F02C 3/34; F02C 9/00; F23C 2202/00
USPC ........................... 60/39.461, 39.463, 736, 727
See application file for complete search history.

(56) References Cited

U.S. PATENT DOCUMENTS

| | | | | |
|---|---|---|---|---|
| 3,720,057 | A * | 3/1973 | Arenson | 60/772 |
| 5,136,838 | A * | 8/1992 | Shekleton et al. | 60/39.23 |
| 5,467,722 | A * | 11/1995 | Meratla | 110/345 |
| 7,389,644 | B1 * | 6/2008 | Nakhamkin | 60/772 |
| 7,600,396 | B2 | 10/2009 | Mak | |
| 7,628,035 | B2 | 12/2009 | Paradowski | |
| 2005/0223712 | A1 * | 10/2005 | Briesch et al. | 60/772 |
| 2007/0220896 | A1 * | 9/2007 | Varatharajan et al. | 60/772 |
| 2008/0060340 | A1 * | 3/2008 | Fletcher et al. | 60/39.6 |
| 2012/0096869 | A1 * | 4/2012 | Kesseli et al. | 60/772 |
| 2014/0182264 | A1 * | 7/2014 | Weisgerber et al. | 60/39.19 |

FOREIGN PATENT DOCUMENTS

| | | | | |
|---|---|---|---|---|
| CA | 2791315 | A1 * | 12/2012 | F02M 21/02 |
| GB | 2064006 | A | 6/1981 | |
| JP | 7229427 | | 8/1995 | |

* cited by examiner

*Primary Examiner* — William H Rodriguez
*Assistant Examiner* — Rene Ford
(74) *Attorney, Agent, or Firm* — Finnegan, Henderson, Farabow, Garrett & Dunner, LLP

(57) ABSTRACT

A system for converting liquid fuel into gaseous fuel is provided. The system may have a supply of liquid fuel. The system may also have a combustor, and one or more pumps in fluid communication with the supply. The one or more pumps may be configured to pump liquid fuel from the supply into the combustor. The system may also have a compressor in fluid communication with an inlet of the combustor, and a turbine in fluid communication with an outlet of the combustor. The turbine may be connected to drive the compressor and the one or more pumps. The system may also have a heat exchanger in fluid communication with an outlet of the turbine and an outlet of the one or more pumps.

18 Claims, 3 Drawing Sheets

CRYOGENIC PUMP SYSTEM FOR CONVERTING FUEL

TECHNICAL FIELD

The present disclosure is directed to a system for converting liquid fuel into gaseous fuel and, more particularly, to a system for converting liquid fuel into gaseous fuel using cryogenic pumps.

BACKGROUND

An engine produces energy by combusting a mixture of air and fuel. A gas turbine engine is one type of engine that includes a compressor, combustor, and turbine. A gaseous fuel, e.g. natural gas, is burned in the combustor and exhaust is generated that drives the turbine. The turbine, in turn, drives the compressor to direct more gas and air into the combustor.

Natural gas may be transported from a location where it is produced to a location where it is consumed by tanker ships, trucks, or trains equipped with cryogenic compartments. Such a tanker may be referred to as an LNG carrier. Since liquefied natural gas ("LNG") takes up only a fraction (about 1/600) of the volume of natural gas in its gaseous state, natural gas is transported in the LNG carrier in a liquid state. LNG may be produced by cooling natural gas below its boiling point (about −161° Celsius at ambient atmospheric pressure), causing it to condense to a liquid. LNG may be stored in cryogenic containers at a pressure between about ambient atmospheric pressure and 250 psi in the LNG carrier.

While it is more practical to transport LNG than compressed natural gas ("CNG") because LNG takes up a fraction of the volume of CNG, most engines require gaseous fuel for combustion. By raising the temperature of the LNG, it may be converted into its gaseous form. A substantial amount of energy is required to convert LNG into its gaseous form and it is critical to minimize the amount of energy wasted during the process. In remote applications away from utility grids, it may be difficult to find a supply of energy sufficient to support large scale conversion of LNG into CNG.

One attempt at minimizing the amount of energy wasted in converting LNG into natural gas or CNG is described in U.S. Pat. No. 7,600,396 (the '396 patent) issued to Mak on Oct. 13, 2009. In particular, the '396 patent describes a regasification plant for converting LNG into CNG by using a portion of the LNG as a coolant. LNG is pumped from a storage tank and split into a first and second portion, which are both employed as a cooling medium in first and second heat exchangers, respectively. Both portions of LNG are fed to a demethanizer, which produces demethanizer overhead product. The demethanizer overhead product is sent back to the first heat exchanger where it may then exit the plant and be sold as LNG vehicle fuel or condensed, pressurized in a pump, and vaporized in an additional series of heat exchangers. To gasify the LNG, potential heat sources include gas turbine combustion air, cooling water of a surface condenser, flue gas from a gas turbine, waste heat from combined cycle power plants, waste heat from steam turbine discharge, and ambient heat within air, seawater, or fuel gas. Some of the heated and compressed supercritical gas is then released from the plant as CNG, while some is expanded in an expander turbine to generate power. The expanded gas is then cooled in heat exchangers before combination with demethanizer overhead product.

Although the regasification plant of the '396 patent may help decrease energy wasted when converting LNG into CNG, the involved system may be limited. That is, the regasification plant of the '396 patent may still require an external source of heat or power, which may restrict the portability and extent of self-powering of the system.

The disclosed system is directed to overcoming one or more of the problems set forth above and/or elsewhere in the prior art.

SUMMARY

In one aspect, the disclosure is directed toward a system for converting liquid fuel into gaseous fuel. The system may include a supply of liquid fuel. The system may also include a combustor, and one or more pumps in fluid communication with the supply. The one or more pumps may be configured to pump liquid fuel from the supply into the combustor. The system may also include a compressor in fluid communication with an inlet of the combustor, and a turbine in fluid communication with an outlet of the combustor. The turbine may be connected to drive the compressor and the one or more pumps. The system may also include a heat exchanger in fluid communication with an outlet of the turbine and an outlet of the one or more pumps.

In another aspect, the disclosure is directed toward a method of converting liquid fuel into gaseous fuel. The method may include pumping a first amount of liquid fuel into a combustor, and directing air to mix with the first amount of liquid fuel and create a fuel/air mixture within the combustor. The method may also include combusting the fuel/air mixture within the combustor to generate a heated exhaust flow, and converting heat energy from the heated exhaust flow into mechanical work. The mechanical work may be used to pump the first amount of liquid fuel and to direct air. The method may also include using a portion of the mechanical work to pump a second amount of liquid fuel, and heating the second amount of liquid fuel with the heated exhaust flow from the combustor to convert the second amount of liquid fuel into gaseous fuel.

DETAILED DESCRIPTION

Figure 1:
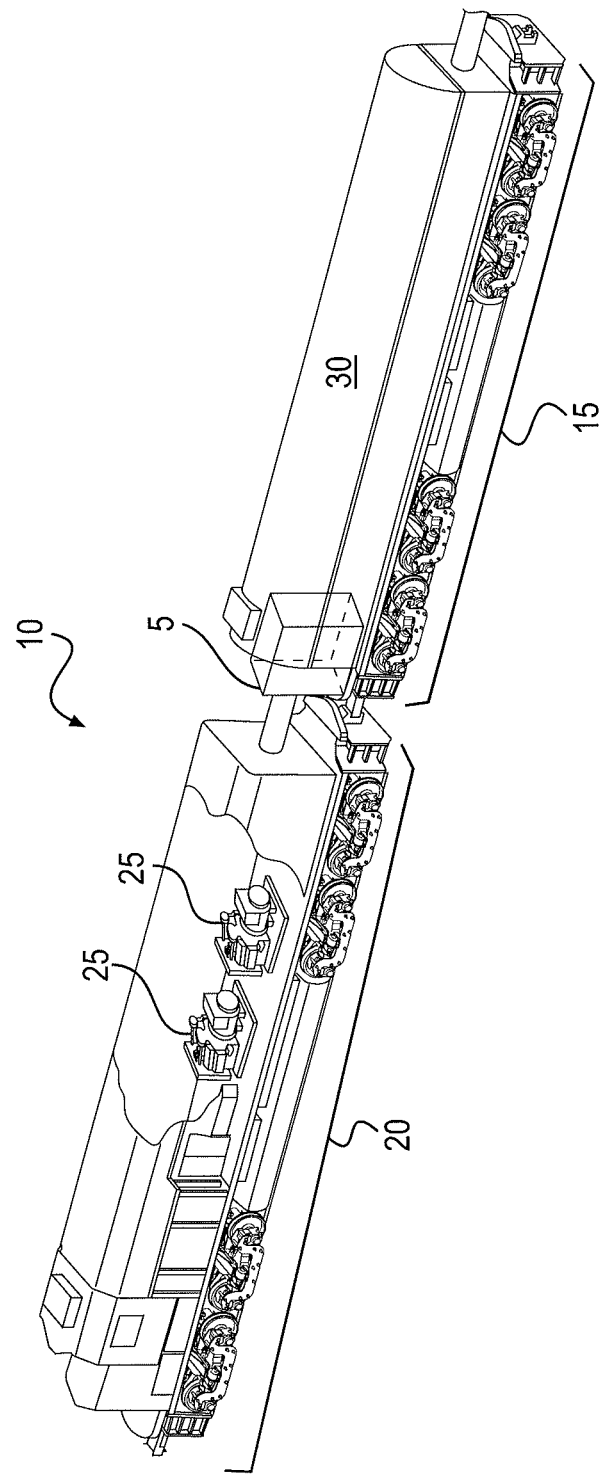
FIG. 1 is a pictorial illustration of an exemplary disclosed train consist.

FIG. 1 illustrates placement of an exemplary conversion system 5 within a train consist 10. As shown in FIG. 1, conversion system 5 may be housed in a tender car 15 of train consist 10, separately from a locomotive 20 having one or more engines 25 supplied with fuel from conversion system 5. Conversion system 5 may be configured to operate independent of or in compliment to engine 25. In addition to housing conversion system 5, tender car 15 may store a supply of liquid fuel. In one embodiment, tender car 15 may store liquid fuel in one or more storage tanks 30, which may be cryogenic tanks, that are configured to maintain temperatures at or below about −162° Celsius at or slightly above ambient atmospheric pressure. Alternatively, conversion system 5 may be housed separately from train consist 10. For instance, conversion system 5 may be kept at a remote stationary location. One skilled in the art will understand and appreciate the portability of conversion system 5 based on the system's components and functionality.

Figure 2:
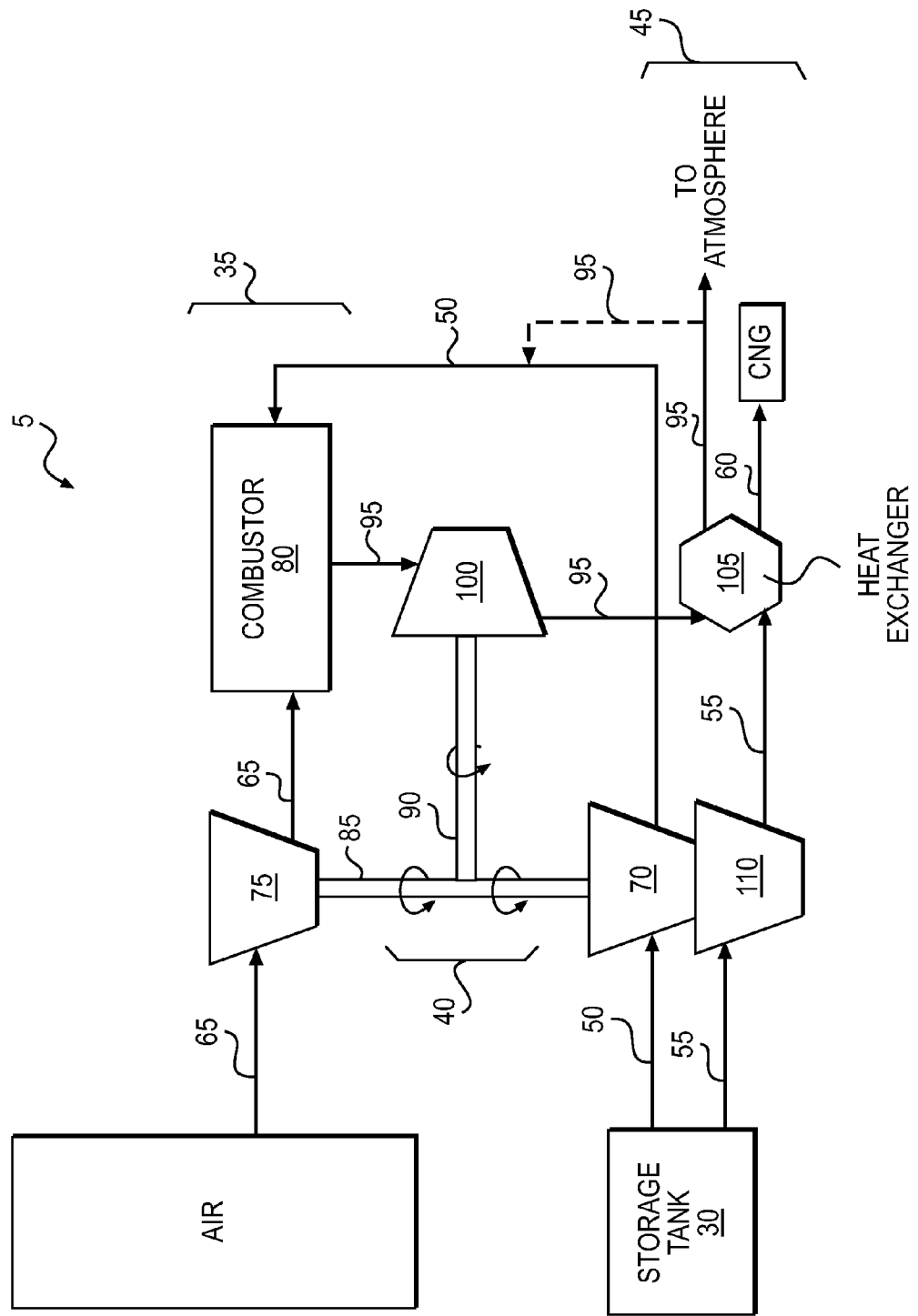
FIG. 2 is a diagrammatic illustration of an exemplary disclosed system for converting liquid fuel into gaseous fuel that may be used in conjunction with the train consist of FIG. 1.

FIG. 2 illustrates a diagrammatic view of conversion system 5. In the embodiment shown in FIG. 2, conversion system 5 may include a combusting subsystem 35, a power subsystem 40, and a heating subsystem 45. Combusting subsystem 35 may facilitate combustion of a first amount 50 of liquid fuel to generate heat energy, which is passed on to power subsystem 40. Power subsystem 40 may convert heat energy from combusting subsystem 35 into mechanical work to drive one or more components in combusting subsystem 35 and heating subsystem 45. Heating subsystem 45 may facilitate conversion of a second amount 55 of liquid fuel into gaseous fuel 60.

Combusting subsystem 35 may include components that cooperate to pump first amount 50 of liquid fuel, mix it with air 65, and combust the fuel/air mixture to generate heat energy. Combusting subsystem 35 may include storage tank 30, a pump 70, a compressor 75, and a combustor 80.

Within combusting subsystem 35, pump 70 may pump first amount 50 of liquid fuel from storage tank 30 to combustor 80. Pump 70, which may be a cryogenic pump, may be in fluid communication with storage tank 30 and combustor 80. Pump 70 may be connected to one or more shafts 85 and 90 to receive mechanical work from power subsystem 40. Pump 70 may be configured to pump a liquid, such as LNG, at a pressure between about 2 and 50 psi from storage tank 30 to combustor 80. Further, pump 70 may pump first amount 50 of liquid fuel in varying volumes and at varying flow rates based on several factors, including the design of combustor 80, an amount and pressure of air 65 supplied to combustor 80 by compressor 75, and desired attributes of a heated exhaust flow 95.

Compressor 75 may compress air 65 and pump it to combustor 80. Compressor 75 may be connected to shafts 85 and 90 to receive mechanical work from power subsystem 40. In one embodiment, compressor 75 may be in fluid communication with an air storage tank and combustor 80. In such an embodiment, compressor 75 may serve as a pump to transport compressed air from the air storage tank to combustor 80. Alternatively, compressor 75 may draw air 65 from the atmosphere.

After receiving first amount 50 of liquid fuel and air 65, combustor 80 may combust the fuel/air mixture to generate heat energy for use by power subsystem 40. Combustor 80 may be in fluid communication with pump 70, compressor 75, and a turbine 100. Upon receiving first amount 50 of liquid fuel from pump 70 and air 65 from compressor 75, combustor 80 may combust the fuel/air mixture to generate heated exhaust flow 95. In one embodiment, combustor 80 may include a cryogenic liquid fuel combustion chamber capable of combusting the fuel/air mixture derived from LNG in its liquid form instead of requiring LNG to first gasify. Following combustion, combustor 80 may release heated exhaust flow 95 to turbine 100 to drive power subsystem 40.

Power subsystem 40 may convert heat energy from combusting subsystem 35 into mechanical work to drive components of combusting subsystem 35 and heating subsystem 45. Power subsystem 40 may include turbine 100 and shafts 85 and 90.

Within power subsystem 40, turbine 100 may convert heat energy into mechanical work. Turbine 100 may be in fluid communication with combustor 80 and a heat exchanger 105, and connected to shafts 85 and 90. Turbine 100 may receive heated exhaust flow 95 from combustor 80 and convert heat energy from heated exhaust flow 95 into mechanical work that is passed through shafts 85 and 90. After converting heat energy from heated exhaust flow 95 into work, turbine 100 may release heated exhaust flow 95 to heat exchanger 105.

Shafts 85 and 90 may pass on mechanical work from turbine 100 to components in combusting subsystem 35 and heating subsystem 45. In particular, shafts 85 and 90 may be connected to drive turbine 100, compressor 75, and pump 70, and an additional pump 110.

After receiving mechanical work from power subsystem 40, heating subsystem 45 may convert second amount 55 of liquid fuel into gaseous fuel 60. Heating subsystem 45 may include pump 110 and heat exchanger 105.

Within heating subsystem 45, pump 110 may pump second amount 55 of liquid fuel from storage tank 30 to heat exchanger 105. Pump 110, which may be a cryogenic pump, may be in fluid communication with storage tank 30 and heat exchanger 105, and connected to shafts 85 and 90. Once turbine 100 produces mechanical work, pump 110 may receive mechanical work via shafts 85 and 90, in parallel with pump 70. In one configuration, pump 110 may be connected to same shaft 85 as pump 70. Pump 110 may be configured to pump liquid fuel at a pressure between about 3,500 and 7,000 psi from storage tank 30 to heat exchanger 105. Further, pump 110 may pump second amount 55 of liquid fuel in varying volumes and at varying flow rates based on several factors, including design of heat exchanger 105 and attributes of heated exhaust flow 95 released from turbine 100.

After receiving second amount 55 of liquid fuel from pump 110, heat exchanger 105 may convert second amount 55 of liquid fuel into gaseous fuel 60 by heating it using heat still retained in heated exhaust flow 95. In one embodiment, heated exhaust flow 95 may be the only non-ambient source of heat to conversion system 5. Heat exchanger 105 may be in fluid communication with turbine 100 and pump 110 and may have one or more outlets to release gaseous fuel 60 and heated exhaust flow 95. Heat exchanger 105 may be configured to heat liquid fuel up to a temperature between about 20° and 100° Celsius at ambient atmospheric pressure. Heating liquid fuel to at least 20° Celsius may prevent the liquid fuel from causing material degradation in steel. Further, heating liquid fuel may cause a phase change to gaseous fuel 60, which may help prevent material degradation by avoiding cavitation erosion.

After converting liquid fuel into gaseous fuel 60, heat exchanger 105 may release heated exhaust flow 95 and the flow of gaseous fuel 60 from conversion system 5. Heat exchanger 105 may have outlets that release heated exhaust flow 95 and gaseous fuel 60 separately. Heat exchanger 105 may be in fluid communication with engine 25 on locomotive 20, and/or with another external engine, and direct gaseous fuel 60 to engine 25. Heat exchanger 105 may be in fluid communication with the atmosphere and may release heated exhaust flow 95 directly into the atmosphere.

Alternatively or additionally, heat exchanger 105 may be in fluid communication with first amount 50 of liquid fuel between storage tank 30 and combustor 80, and may direct heated exhaust flow 95 to mix with first amount 50 of liquid fuel. By mixing heated exhaust flow 95 with first amount 50 of liquid fuel prior to combustion, heated exhaust flow 95 may preheat the fuel/air mixture prior to combustion and/or change the attributes of the fuel/air mixture. In one embodiment, heat exchanger 105 may direct up to 50 percent of heated exhaust flow 95 into first amount 50 of liquid fuel, which may introduce nitrogen and water into gaseous fuel 60 and provide positive effects for NOx reduction when injected into engine 25. By varying the stoichiometry of the fuel/air mixture entering combustor 80, different exhaust compositions may be achieved that could be beneficial for various operating regimes of engine 25. For instance, burning a very lean fuel/air mixture may lead to a significant reduction of unburnt fuel that produces NOx in combustor 80 by reducing peak combustion temperatures. Burning a very rich fuel/air mixture may reduce NOx by consuming the available oxygen in other reactions, preventing the formation of NOx.

Alternatively or additionally, heat exchanger 105 may be in fluid communication with engine 25 on locomotive 20 or with another external engine. In this embodiment, heat exchanger 105 may release heated exhaust flow 95 from conversion system 5 for recirculation within engine 25.

Conversion system 5 may be, at least partially, self-powering. In one embodiment, pumps 70 and 110 and compressor 75 may be driven by only turbine 100. In another embodiment, mechanical work converted from heat energy of heated exhaust flow 95 may be the only source of work used to pump first amount 50 of liquid fuel and second amount 55 of liquid fuel and to direct air 65.

Figure 3:
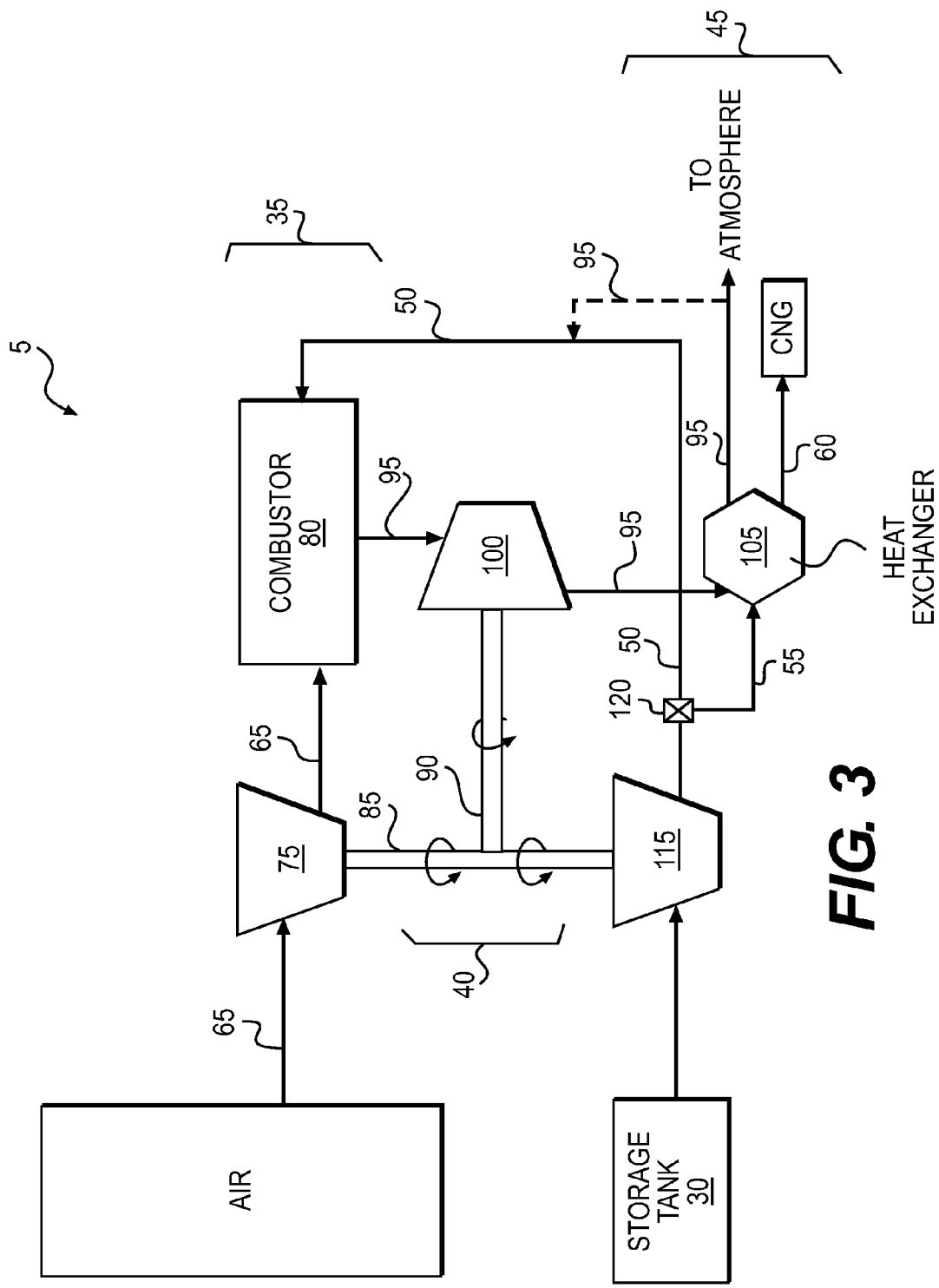
FIG. 3 is a diagrammatic illustration of another exemplary disclosed system for converting liquid fuel into gaseous fuel that may be used in conjunction with the train consist of FIG. 1.

In an alternative embodiment depicted in FIG. 3, conversion system 5 may have a pump 115 in fluid communication with a regulator 120 to perform the duties of pumps 70 and 110 of FIG. 2. Pump 115 may be in fluid communication with storage tank 30 and regulator 120, and connected to shafts 85 and 90. Pump 115 may receive mechanical work from turbine 100 via shafts 85 and 90 and discharge liquid fuel to regulator 120. Regulator 120, which may be a three-way valve or other device to divert liquid fuel in multiple directions, may also be in fluid communication with combustor 80 and heat exchanger 105. In this configuration, pump 115 may pump liquid fuel from storage tank 30 to regulator 120, and regulator 120 may divert first amount 50 of liquid fuel to combustor 80 and second amount 55 of liquid fuel to heat exchanger 105. Pump 115 and regulator 120, in combination, may be configured to pump liquid fuel at a pressure between about 2 and 50 psi from storage tank 30 to combustor 80. Further, regulator 120 may divert first amount 50 of liquid fuel in varying volumes and at varying flow rates based on several factors, including the design of combustor 80, amount and pressure of air 65 supplied to combustor 80 by compressor 75, and desired attributes of heated exhaust flow 95. Pump 115 and regulator 120, in combination, may also be configured to pump a liquid, such as LNG, at a pressure between about 3,500 and 7,000 psi from storage tank 30 to heat exchanger 105. Further, regulator 120 may divert second amount 55 of liquid fuel in varying volumes and at varying flow rates based on several factors, including the design of heat exchanger 105 and attributes of heated exhaust flow 95 released from turbine 100.

Alternatively, in another embodiment (not shown), regulator 120 may be omitted and pump 115 may have two or more outlets, with at least one outlet in fluid communication with combustor 80 and at least one outlet in fluid communication with heat exchanger 105.

INDUSTRIAL APPLICABILITY

The disclosed system may have increased portability and enable use of liquid fuel to power components within the system. Conversion system 5 may also achieve increased fuel efficiency and reduced NOx emissions, as heated exhaust flow released from heat exchanger 105 may be recirculated back into conversion system 5, or into engine 25. The operation of conversion system 5, specifically the interaction between combusting subsystem 35, power subsystem 40, and heating subsystem 45, will now be explained with reference to FIG. 2.

Combusting subsystem 35 may pump first amount 50 of liquid fuel from storage tank 30, mix it with air 65, and combust the fuel/air mixture to generate heat energy for power subsystem 40. Specifically, pump 70 may pump first amount 50 of liquid fuel from storage tank 30 to combustor 80, while compressor 75 may compress and direct air 65 to combustor 80. First amount 50 of liquid fuel may mix with air 65 inside of combustor 80, creating a fuel/air mixture, and combustor 80 may combust the fuel/air mixture to generate heated exhaust flow 95. Combustor 80 may direct heated exhaust flow 95 to turbine 100 to provide heat energy for power subsystem 40.

Power subsystem 40 may convert heat energy from combusting subsystem 35 into mechanical work to drive components in combusting subsystem 35 and heating subsystem 45. After receiving heated exhaust flow 95 from combustor 80, turbine 100 may convert heat energy from heated exhaust flow 95 into mechanical work. Turbine 100 may convey mechanical work to shafts 85 and 90, which may pass along the work to pumps 70 and 110, and compressor 75. Turbine 100 may direct heated exhaust flow 95 to heat exchanger 105.

Heating subsystem 45 may use a portion of the mechanical work generated in power subsystem 40 to pump second amount 55 of liquid fuel, and may convert second amount 55 of liquid fuel into gaseous fuel 60. Upon receiving mechanical work from shafts 85 and 90, pump 110 may pump second amount 55 of liquid fuel from storage tank 30 to heat exchanger 105. Heat exchanger 105 may receive heated exhaust flow 95 from turbine 100 and heat second amount 55 of liquid fuel. Heat exchanger 105 may release gaseous fuel 60 and heated exhaust flow 95 from conversion system 5. Heat exchanger 105 may supply engine 25 of locomotive 20, or another external engine, with gaseous fuel 60 from conversion system 5. In one embodiment, heat exchanger 105 may release heated exhaust flow 95 directly into the atmosphere. In another embodiment, heat exchanger 105 may recirculate heated exhaust flow 95 back into conversion system 5 by mixing it with first amount 50 of liquid fuel. In yet another embodiment, heat exchanger 105 may recirculate heated exhaust flow 95 of conversion system 5 into engine 25 on locomotive 20, or into another external engine.

In another embodiment shown in FIG. 3, pumps 70 and 110 may be replaced by pump 115 and regulator 120. In combusting subsystem 35 and heating subsystem 45, pump 115 may pump liquid fuel from storage tank 30 to regulator 120. Regulator 120 may divert first amount 50 of liquid fuel to combustor 80 and second amount 55 of liquid fuel to heat exchanger 105. With respect to power subsystem 40, pump 115 may receive the mechanical work passed through shafts 85 and 90. Alternatively, pump 115 and regulator 120 may be used in complement to pumps 70 and 110.

In yet another embodiment, the combination of pump 115 and regulator 120 may be replaced by pump 115 having two or more outlets. Instead of regulator 120 diverting first amount 50 of liquid fuel to combustor 80 and second amount 55 of liquid fuel to heat exchanger 105, pump 115 may have one outlet directing first amount 50 of liquid fuel to combustor 80 and another outlet directing second amount 55 of liquid fuel to heat exchanger 105. Alternatively, pump 115 may be used in complement to pumps 70 and 110, and/or regulator 120. The components employed in conversion system 5, particularly the pumps and/or regulators used therein, may be tailored to meet certain requirements, including flow rate, flow volume, and spatial limitations.

Conversion system 5 may increase portability of a system for converting liquid fuel into gaseous fuel 60. In particular, by not requiring an external engine, conversion system 5 may be used at a remote location for local conversion of liquid fuel into gaseous fuel 60. In one embodiment, conversion system 5 may be placed on tender car 15 to facilitate transportation to on-site locations. A person having skill in the art would understand and appreciate the portability of conversion system 5 among other benefits.

Conversion system 5 may also be self-powering. By using combustion of liquid fuel within the system to power components within the system, conversion system 5 may not require a utility grid or other external source of heat or power.

In addition to improved portability and self-powering, conversion system 5 may also employ heated exhaust flow 95 to improve performance of conversion system 5 and combustor 80. In particular, heated exhaust flow 95 may be recirculated into combustor 80 to reduce NOx emissions. This exhaust recirculation may be handled without external components on the engine and may be varied to achieve different exhaust compositions or to benefit the exhaust of an external engine.

An additional benefit of the exemplary embodiments of conversion system 5 is that combustor 80 may combust a fuel/air mixture derived from fuel in liquid form. Instead of requiring liquid fuel to gasify first, operating may begin without delay.

Yet another benefit is the versatility of design between the embodiments shown in FIGS. 2 and 3 to use multiple pumps, a pump with a regulator, a pump with multiple outlets, or a combination thereof. Various embodiments of conversion system 5 may be employed based on availability of corresponding components and system requirements.

It will be apparent to those skilled in the art that various modifications and variations can be made to the system of the present disclosure. Other embodiments of the system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A system for converting liquid fuel into gaseous fuel, comprising:
    a supply of cryogenic liquid fuel;
    a combustor, the combustor including a cryogenic liquid fuel combustion chamber configured for combusting a fuel/air mixture derived from the liquid fuel without having to first gasify the liquid fuel;
    one or more pumps in fluid communication with the supply and configured to pump the liquid fuel from the supply into the combustor in liquid form;
    a compressor in fluid communication with an inlet of the combustor;
    a turbine in fluid communication with an outlet of the combustor to receive heated exhaust flow from the combustor and connected to drive the compressor and the one or more pumps; and
    a heat exchanger in fluid communication with an outlet of the turbine to receive the heated exhaust flow from the turbine, and in fluid communication with an outlet of the one or more pumps and an outlet of the heat exchanger in fluid communication with an inlet of the combustor to supply the heated exhaust flow into the liquid fuel upstream of the combustor.

2. The system of claim 1, further including an air storage tank in fluid communication with the compressor, wherein the compressor is configured to divert air from the air storage tank into the inlet of the combustor.

3. The system claim 1, further including a regulator in fluid communication with the one or more pumps, the combustor, and the heat exchanger.

4. The system claim 1, wherein the one or more pumps includes a pump having a first outlet in fluid communication with the combustor and a second outlet in fluid communication with the heat exchanger.

5. The system claim 1, wherein the supply, combustor, one or more pumps, compressor, turbine, and heat exchanger are housed in a tender car of a train consist.

6. The system of claim 5, wherein the heat exchanger has an outlet directed to an engine of a locomotive pulling the tender car.

7. The system claim 1, wherein the combustor is configured to combust liquid fuel to generate a heated exhaust flow, and the heated exhaust flow is the only non-ambient source of heat to the system.

8. The system of claim 1, wherein the compressor and the one or more pumps are driven by only the turbine.

9. A method of converting liquid fuel into gaseous fuel, comprising:
    pumping a first amount of cryogenic liquid fuel into a combustor including a liquid fuel combustion chamber configured to combust a fuel/air mixture derived from the liquid fuel in its liquid form without having to first gasify the liquid fuel;
    directing air fed through a compressor to mix with the first amount of the liquid fuel and create a fuel/air mixture within the combustor;
    combusting the fuel/air mixture within the combustor to generate a heated exhaust flow;
    converting heat energy from the heated exhaust flow into mechanical work with a turbine, the mechanical work used to pump the first amount of liquid fuel and to direct the air;
    using a portion of the mechanical work to drive the compressor and pump a second amount of liquid fuel; and
    mixing a portion of the heated exhaust flow with the first amount of liquid fuel, and heating the second amount of liquid fuel with the heated exhaust flow from the combustor to convert the second amount of liquid fuel into gaseous fuel.

10. The method of claim 9, further including mixing a portion of the heated exhaust flow with the second amount of liquid fuel and directing the heated exhaust flow into an external engine.

11. The method of claim 9, further including directing the gaseous fuel into an external engine.

12. The method of claim 9, wherein:
    the steps of pumping the first amount of liquid fuel, directing air, combusting the fuel/air mixture, converting heat energy, using a portion of the mechanical work to pump the second amount of liquid fuel, and heating the second amount of liquid fuel are performed onboard a tender car; and
    the method further includes:
    mixing a portion of the heated exhaust flow with the second amount of liquid fuel; and
    directing the heated exhaust flow into an engine of a locomotive pulling the tender car.

13. The method of claim 9, wherein:
    the steps of pumping the first amount of liquid fuel, directing air, combusting the fuel/air mixture, converting heat energy, using a portion of the mechanical work to pump the second amount of liquid fuel, and heating the second amount of liquid fuel are performed onboard a tender car; and the method further includes directing the gaseous fuel to an engine of a locomotive pulling the tender car.

14. The method of claim 9, wherein the mechanical work converted from the heat energy of the heated exhaust flow is the only source of work used to pump the first amount and the second amount of liquid fuel and to direct the air.

15. The method of claim 9, wherein pumping the first amount of liquid fuel includes pumping a first amount of liquid fuel through a first outlet of a pump and into a combustor; and pumping the second amount of liquid fuel includes pumping the second amount of liquid fuel through a second outlet of the pump.

16. The method of claim 9, wherein pumping the first amount of liquid fuel includes pumping a first amount of liquid fuel through a pump and a regulator and into a combustor; and pumping the second amount of liquid fuel includes pumping the second amount of liquid fuel through the pump and the regulator.

17. The method of claim 9, further including storing the gaseous fuel in a compressed state.

18. A method of converting LNG (Liquid Natural Gas) into CNG (Compressed Natural Gas), comprising:

pumping a first amount of LNG from a cryogenic tank on a tender car of a train consist into a combustor using one or more pumps, the combustor including a liquid fuel combustion chamber configured to combust a fuel/air mixture derived from the liquid fuel in its liquid form without having to first gasify the liquid fuel;

directing air to mix with the first amount of LNG to create a fuel/air mixture within the combustor using a compressor;

combusting the fuel/air mixture within the combustor to generate a heated exhaust flow;

pumping a second amount of LNG from the cryogenic tank into a heat exchanger using the one or more pumps;

converting heat energy from the heated exhaust flow into mechanical work with a turbine, the mechanical work used to pump the first amount of LNG, to drive the compressor, and to pump the second amount of LNG;

heating the second amount of LNG with the heated exhaust flow from the combustor to convert the second amount of LNG into CNG;

mixing the first amount of LNG with the heated exhaust flow from the combustor; and directing the CNG to an engine housed on a locomotive of the train consist.

* * * * *